Patented May 18, 1926.

1,584,922

UNITED STATES PATENT OFFICE.

JOSEPH GEPPERT, OF CHICAGO, ILLINOIS, ASSIGNOR OF ONE-HALF TO MAX GIESE, OF CHICAGO, ILLINOIS.

ALLOY AND METHOD OF PRODUCING THE SAME.

No Drawing.   Application filed October 6, 1922. Serial No. 592,785.

The invention relates to a new composition of matter, and more particularly to an alloy, and to the method of producing the same.

It is an object of the invention to provide an alloy which constitutes a good bond for glass or vitreous objects and which has the same coefficient of expansion and contraction as glass.

It is a further object to provide an alloy which not only forms a perfect bond for the union of vitreous materials, but also permanently secures together metal and metal or metal and vitreous objects.

It is a still further object to provide an alloy which strongly adheres to vitreous material by reason of its inherent properties.

It is a further object to provide a simple and efficient method for producing an alloy of the character described.

With these and other objects in view, the invention comprises certain ingredients mixed in certain proportions, and the steps of carrying out the method for producing the novel composition of matter as fully set forth in the following specification are particularly pointed out in the claims forming a part thereof.

The composition as stated hereinabove may be used as a bond for uniting metal and glass and glass and glass. When the term glass is used all vitreous materials are included.

Adherence of the bond to glass is not predicated upon the partial solution of the alloy by fused glass but is based on the inherent property of the alloy.

In order to unite two vitreous materials or a vitreous material and a metal, certain conditions arise which must be taken into consideration, so as to obtain an efficient and permanent bond.

These conditions may be grouped as follows:

1. The surfaces are plane.
2. The surfaces are curved.
3. The properties of the metal, its thickness and coefficient of expansion.
4. The properties of the vitreous material, its composition, thickness and coefficient of expansion.
5. The distance between the surfaces to be united.

Depending on the presence of one or the other of the aforementioned conditions the percentage of the various ingredients of the novel composition must be varied, so that the necessary expansion is imparted thereto. In the absence of the fulfillment of this requirement the vitreous material by reason of inequality of expansion may be caused to break or a shearing may take place.

The composition which I have formed to admirably lend itself to the purpose of a bonding means for metal and glass is an alloy consisting of lead, cadmium and antimony.

Therein lead acts as a carrier or vehicle and is distinguished by its practically negligible contraction and expansion when combined with antimony. Cadmium lowers the surface tension of the alloy and thus enhances the efficiency of the alloy as bond.

In addition bismuth may be added which acts to reduce the fusing temperature and consequently increases the fluency of the alloy. It also enhances the adherence of the alloy.

In producing the alloy the same is obtained in two component parts, the one part being the ordinary type metal, while the other part is a mixture of bismuth, lead, and cadmium.

The general formula for producing the alloy is as follows:

Alloy A.

50 parts by weight of bismuth.
39.60 parts by weight of lead.
10.40 parts by weight of cadmium.

Alloy B.

25 parts by weight of antimony.
75 parts by weight of lead.

Both alloys are fused together and mixed in accordance with the formula:

$$\frac{A + nB}{n + 1}$$

Depending on the special requirements to be met the alloys are mixed in the following proportions:

$$\frac{A + B}{2}, \frac{A + 2B}{3}, \frac{A + 3B}{4}, \frac{A + 4B}{5}, \text{etc.}$$

These requirements are given by the expansion and contraction of the material to be bonded. In case of great expansion a greater content of B is selected and conversely in case of great contraction, a smaller content of B is chosen.

Instead of integers, fractional quantities of alloy may be employed as follows:

$$\frac{A \text{ plus } 1/2B}{1 1/2}, \frac{A \text{ plus } 2/3B}{1 2/3}, \text{ etc.}$$

Thus an alloy mixed in accordance with the formula $$\frac{A \text{ plus } B}{2}$$

has the following quantities of ingredients: 25 parts by weight of bismuth, 57.30 parts by weight of lead, 12.50 parts by weight of antimony, 5.20 parts by weight of cadmium. The alloy $$\frac{A \text{ plus } 4B}{5}$$

10 parts by weight of bismuth, 67.92 parts by weight of lead, 2.08 parts by weight of cadmium, and 20 parts by weight of antimony.

The limits between which the various ingredients are employed for the purpose of obtaining the alloy are as follows: bismuth 2 to 16 parts by weight; lead 62 to 72 parts by weight; antimony 16 to 24 parts by weight; cadmium .5 to 7.5 parts by weight.

The greater the amount of the alloy designated by B the higher is the fusion point. At the same time the expansion and contraction of the alloy adhering is lessened.

If desired other metals may be added to the alloy in order to influence the fusion point thereof.

In producing the alloy, antimony is first fused and lead in ordinary condition is added thereto. Subsequently bismuth is added and the whole is left standing until it cools until almost solid consistency.

Thereafter cadmium is added and the mixture is heated to a temperature of approximately 320 degrees centigrade at which point cadmium melts.

Attention is called to the fact that the sequence of steps as outlined must be carefully followed as the incorporation of cadmium is otherwise very difficult if not entirely impossible.

In order to provide a bond between the surfaces of two vitreous materials or a vitreous material and a metal body, the surfaces are carefully cleaned, dried and heated on an aluminum or graphite base, or in a form to the fusion temperature of the alloy in order to prevent breaking of the glass. The alloy is fused in a melting-pot, and the liquid alloy is drained into the interspace between the surfaces to be bonded so that the oxydes formed during the melting of the alloy remains on the surfaces thereof or in the pot but do not flow into said interspace.

The proportion necessary for mixing alloys A and B is readily established from the coefficient of expansion of the materials to be bonded. The variance between the expansion and contraction of the material and the alloy is established by pouring the moulten alloy into a glass tube, or by fusing a ring of the alloy to the exterior of the glass tube. In the former case, upon cooling, if the contraction of the glass is greater than that of the alloy, the glass will be broken. In the second case, if the contraction of the alloy is greater than that of the glass, the latter is sheared off by the pressure of the alloy ring. If the contraction of the alloy is smaller than the glass, then the glass breaks in longitudinal direction. Having thus established experimentally the coefficient of expansion the alloys are mixed to meet the particular conditions. Of greater interest is merely the distance between the two surfaces constituting the joint.

A metal body upon cooling contracts toward its center point. This, however, is not the case in annular bodies. Here the contraction is a composite movement being toward the center point of the ring and toward center point of the cross section.

If, therefore, two annular bodies are to be bonded of which the outer body has a higher and the inner body has a lower coefficient of expansion, the condition is more advantageous the greater the distance between the two surfaces is, because the contraction of the metal body toward the center of the cross section leaves more space for the contraction of the outer surface.

The particular method of producing the method has also been referred to by way of examples and not for the purpose of imitation.

I therefore claim my invention as broadly as the state of the art permits.

I claim:

A new composition of matter, comprising 2 to 16 parts by weight of bismuth, 62 to 72 parts by weight of lead, 16 to 24 parts by weight of antimony, and .5 to 7.5 parts by weight of cadmium.

In witness whereof I affix my signature.

JOSEPH GEPPERT.